2,115,346

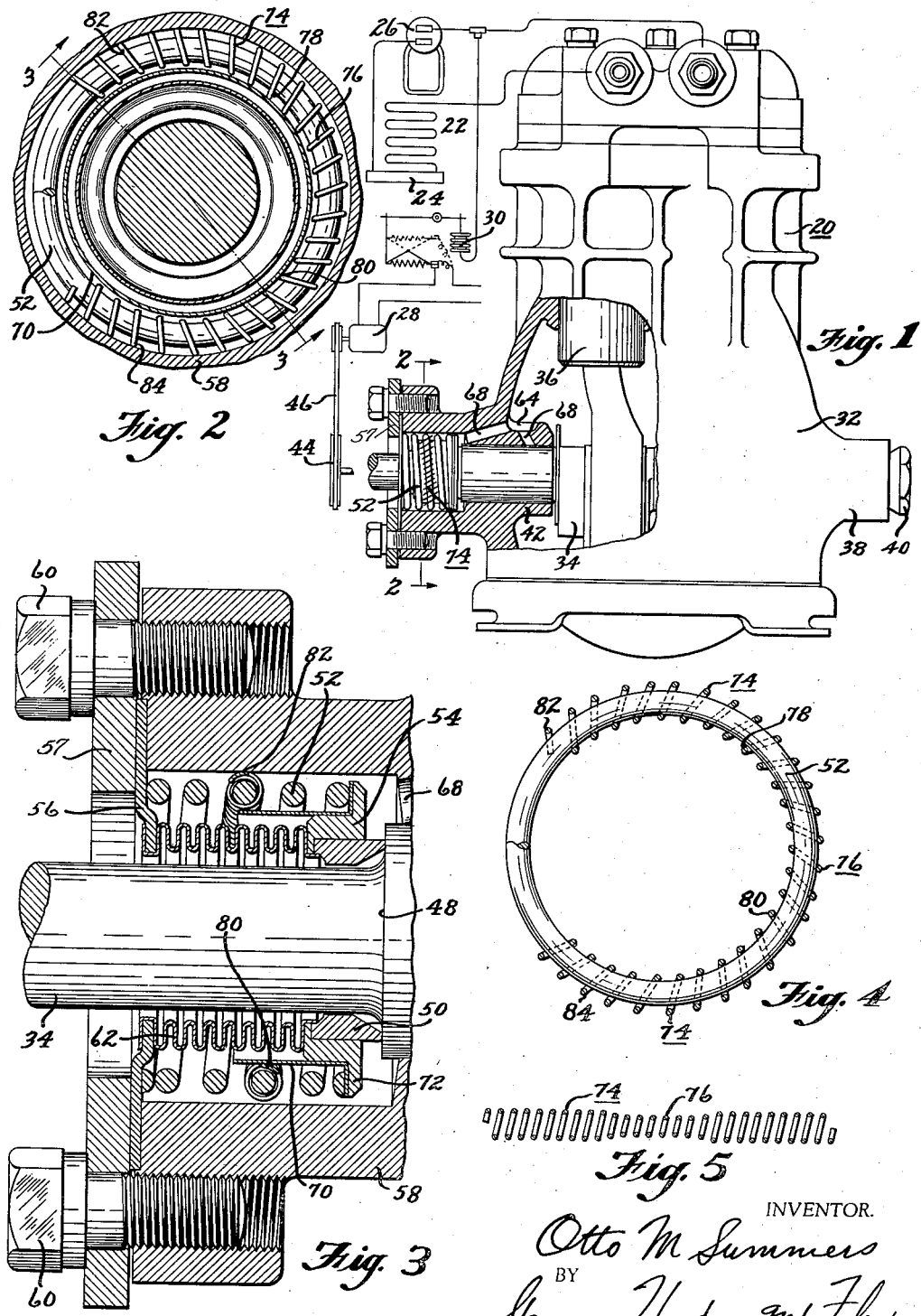
April 26, 1938. O. M. SUMMERS 2,115,346
SEAL FOR REFRIGERATING APPARATUS
Filed Aug. 31, 1935
INVENTOR.
Otto M Summers
BY Spencer Hardman and Fehr
ATTORNEYS Patented Apr. 26, 1938

UNITED STATES PATENT OFFICE

2,115,346

SEAL FOR REFRIGERATING APPARATUS

Otto M. Summers, Dayton, Ohio, assignor to General Motors Corporation, Dayton, Ohio, a corporation of Delaware Application August 31, 1935, Serial No. 38,795

8 Claims. (Cl. 286—11)

This invention relates to refrigerating apparatus and more particularly to shaft seals for the compressors of refrigerating apparatus provided with vibration dampening means.

In my prior Patent No. 1,822,067, I have provided a vibration dampening means in the form of a sleeve 60 which is mounted upon the inside of the spring 55 which furnishes the pressure for holding the sealing surfaces together. This vibration dampening means is exposed to the outside and thus may be covered with dirt and grime and has no means for lubrication. Furthermore, this vibration dampening means is not as flexible as desired and does not have a sufficiently large diameter to take care of all the different forms of seal vibrations which may be found in different compressors manufactured by ordinary mass production methods.

It is an object of my present invention to provide a more resilient vibration dampening means for a shaft seal which will be more efficient and which will permit a greater amount of misalignment of the sealing surfaces.

It is a further object of my invention to provide a shaft seal with a vibration dampening means which extends outside of a metal bellows between the sealing ring and the wall structure so that it may be more efficient and be provided with lubrication in addition to being sealed within the enclosure.

Further objects and advantages of the present invention will be apparent from the following description, reference being had to the accompanying drawing, wherein a preferred form of the present invention is clearly shown.

In the drawing:

Fig. 1 is a view in elevation and partly in section of a compressor provided with a shaft seal embodying my invention together with a diagrammatic representation of the remaining elements of a compression refrigerating system;

Fig. 2 is an enlarged section taken along the lines 2—2 of Fig. 1, showing particularly my improved vibration dampening means;

Fig. 3 is a section through the shaft seal taken along the lines 3—3 of Fig. 2;

Fig. 4 is a view in elevation of a portion of the spring for pressing the sealing ring against the shoulder of the shaft, together with the vibration dampening spring threaded thereon; and Fig. 5 is a sectional view of the vibration dampening spring itself upon a scale one-half the size of Figs. 2, 3 and 4.

Shaft seals of the metal bellows types are ordinarily subject to audible torsional vibration which is, of course, very undesirable in domestic refrigerating apparatus. This is perhaps due to the fact that the bellows has sufficient torsional resiliency to permit torsional vibration to be set up by the frictional resistance between the sealing ring and the shoulder on the shaft. Such sealing rings are usually held against the shoulder on the shaft by a coil spring. In the embodiment of my invention shown in the drawing, I provide a resilient vibration dampening spring extending between a sleeve projecting from the sealing ring and the outer wall of the cavity containing the shaft seal. This spring dampens and controls the torsional vibrations of the sealing ring and the free end of the bellows to such an extent that these vibrations are rendered inaudible.

Referring now to the drawing and more particularly to Fig. 1, there is shown a refrigerating system including a compressor 20 for compressing the refrigerant and for forwarding the compressed refrigerant to a condenser 22 where the compressed refrigerant is liquefied and collected in a receiver 24. From the receiver 24, the liquid refrigerant is forwarded to an evaporating means 26 where the liquid refrigerant evaporates under reduced pressure and is returned to the compressor. The compressor 20 is driven by an electric motor 28 under the control of a snap acting switch means 30 controlled according to the pressure and the temperature of the evaporating means 26.

The compressor 20 is provided with a crank case 32 containing a drive shaft 34 for reciprocating the pistons 36 in the compressor to compress the refrigerant. This compressor is provided with a bearing 38 which is closed by a plug 40 and a second bearing 42 by means of which the shaft extends through the wall of the crank case to the pulley 44 which is driven by the belt 46 from the electric motor 28.

Inasmuch as refrigerant is ordinarily present in the crank case at a pressure either above or below the pressure of the atmosphere, it is necessary to provide some sort of a seal for the end of the shaft which carries the pulley so that air will not be admitted to the crank case and to prevent the escape of refrigerant. In order to do this, I provide a shoulder 48 upon the shaft against which a sealing ring 50 having a narrow annular sealing face is pressed by a coil spring 52 which is concentric to the drive shaft 34 and which coil spring extends between a ring 54 which forms an integral part of the sealing ring 50 and an end plate 56 which is held tightly in sealing engagement with the outer end of the boss 58 which extends from the side of the crank case 32 and receives the end of the drive shaft 34. This end plate is held in sealing engagement by a clamping plate 57 which is clamped to the outer end of the boss by the cap screws 60. The sealing ring 50 is connected to the end plate 56 by a flexible metal bellows 62 for providing a hermetic seal between the walls of the crank case which confine the refrigerant and the shoulder 48 upon the shaft so that no air, gas or liquid may escape from or into the crank case 32 of the compressor.

The compressor is provided with an oil pocket 64 directly above the bearing 42 which is kept filled with lubricant by the splashing of the lubricant within the crank case. From this oil pocket, the oil is supplied to the bearing 42 and to the cavity surrounding the shaft seal by the oil passages 66 and 68. In this way, the shaft seal is kept supplied with lubricant to prevent wear of the sealing faces.

However, in spite of the lubrication there appears to be a torsional vibration of the sealing ring and bellows set up by the friction between the sealing surfaces. This is believed to be due to the torsional resiliency of the metal bellows 62 which in addition to the coil spring 52 which is even more resilient are the only means normally provided for restraining torsional movement or rotation of the sealing ring in the stationary type of seal. This torsional vibration in great numbers of compressors has provided noises which are objectionable and in some cases very disagreeable. In order to prevent these disagreeable noises, I have provided vibration dampening means which dampen the torsional vibrations of the sealing ring sufficiently to make them inaudible. In order to improve the performance of this vibration dampening means and to prevent all noises as much as possible, I place this vibration dampening means in the space surrounding the metal bellows so that it is provided with lubricant from the oil pocket 64 through the oil passage 68. This vibration dampening means extends between the ring 54 which is sealed to the sealing ring 50 and the inner wall of the boss 58 which encloses the shaft seal. This inner wall of the boss provides a large diameter which aids in dampening the vibrations.

This may seem a very simple procedure and a very simple construction to provide. However, it must be remembered that in order for the sealing ring 50 to make a tight hermetic seal with the shoulder 48 of the shaft 34, it is necessary that the sealing ring be able to conform itself to any misalignment or irregularity of the shoulder without appreciable restraint. In order to do this, I have provided a sleeve 70 having a flange 72 which is held against the flange of the ring 54 by the coil spring 52 which has its one end bearing against the flange 72. This sleeve 70 extends for about half the length of the shaft seal and is spaced from both the coil spring 52 and the metal bellows 62. This coil spring 52 is provided with a peculiarly shaped vibration dampening spring 74 which is threaded thereon as shown in Figs. 2, 3 and 4 and which is provided with a central reduced portion 76 as shown in Fig. 5. This vibration dampening spring is provided with this peculiar shape in order to provide resiliency to the vibration dampening means so that the sealing ring will not be under any restraint.

When this vibration dampening spring 74 is threaded onto the coil spring 52, the central necked-in portion 76 will grip the coil spring 52 and cause this portion of the spring to follow the helical contour of the coil spring 52. The ends of this vibration dampening spring are preferably made with an inner diameter about one-third larger than the diameter of the wire of the coil spring 52 upon which it is threaded. This causes the full size portions of the vibration dampening spring nearest the necked-in portions to be nearly concentric with and spaced from the portion of the coil spring upon which it is threaded, while the end portions of this vibration dampening spring will tend to extend out straight along a tangent and, therefore, will be prevented from so doing by its engagement with the inner periphery of the coil spring 52. This will make the vibration dampening spring extend the farthest outwardly from the coil spring 52 at the end portions of this vibration dampening spring, while the portions immediately on either side of the necked-in central portions of the vibration dampening spring will extend farthest inwardly. This is shown in Fig. 4 and its application is shown in Figs. 2 and 3.

Referring now more particularly to Fig. 2, it will be seen that the necked-in portion 76 does not touch either the inner wall of the boss 58 or the sleeve 70. However, it will be seen that the portions designated by the reference characters 78 and 80 on either side contact with the sleeve 70 and that these portions are the only portions which contact the sleeve 70. Likewise, it will be seen that about 6 or 7 coils at each end of the spring 74 designated by the reference characters 82 and 84 contact with the inner cylindrical wall of the boss 58 and that these are the only coils which contact the inner annular wall of this boss 58. It will be seen that there are several coils which separate the coils which touch the sleeve 70 and those which touch the inner periphery of the boss 58. This is done so as to provide an extremely resilient construction so that the only force which might oppose any movement of the sealing ring 50 at an angle to the shaft 34 will be the force tending to retain the spring 74 in a straight position as shown in Fig. 5. It will be appreciated that this force is relatively small.

It should be noted that any direct engagement of a single coil between the sleeve 70 and the inner periphery of the boss 58 has been avoided because of the fact that any movement of the sealing ring in such an arrangement would make it necessary to compress such a coil which would be rather difficult because the individual coils of such a spring are rather stiff. The sleeve 70, of course, moves with the sealing ring 50 and with the torsional vibrations of the sealing ring and free end of the bellows 62. The spring means 74 which is placed between this sleeve 70 and the inner periphery of the boss 58 and contacts each of these surfaces as explained just above at a number of points, opposes the torsional vibration of the sealing ring and free end of the bellows. In the first place, it imposes a frictional resistance to the vibration and also imposes a resilient resistance to such movement which changes the natural frequency of the vibration. Each of these factors aid in making the vibrations of the shaft seal inaudible. By this means which acts in two different ways, I have provided an improved shaft seal which has no audible vibrations. This means is simple, inexpensive and well adapted to mass production methods. This vibration dampening means operates in an enclosed space sealed from the atmosphere, which space is supplied with lubricant, thereby preventing any squeaks due to the sliding resistance provided by the vibration dampening spring 14 and also preventing wear upon this spring.

While the form of embodiment of the invention as herein disclosed constitutes a preferred form, it is to be understood that other forms might be adopted, all coming within the scope of the claims which follow.

What is claimed is as follows:

1. A shaft seal including a confining means having an aperture therethrough and a shaft means extending through the aperture, a seal for said shaft means having hermetic connections with said shaft means and said confining means, one of said connections being a relatively rotating sliding connection, resilient means for maintaining said relatively rotating sliding connection hermetically sealed, and vibration dampening means extending between the sliding connection and one of said means and contacting said resilient means for preventing audible vibration of said seal and said resilient means.

2. A shaft seal including a confining means having an aperture therethrough and a shaft means extending through the aperture, a seal for said shaft means having hermetic connections with said shaft means and said confining means, said hermetic connections including an annular bellows and a set of relatively rotating annular sealing surfaces in contact with each other, one of which is connected to the bellows, resilient means for maintaining said relatively rotating sealing surfaces in contact with each other, and vibration dampening spring means extending between the sliding connection and one of said means and contacting said resilient means for preventing audible vibration of said seal and said resilient means.

3. A shaft seal including a confining means having an aperture therethrough and a shaft means extending through the aperture, a seal for said shaft means having hermetic connections with said shaft means and said confining means, one of said connections being a relatively rotating sliding connection and the other being a fixed connection, and vibration dampening means including a coil spring having its axis disposed in a plane transverse to the shaft, and having one of its coils in engagement with the seal and another of its coils in engagement with said means to which the seal has fixed connection.

4. A shaft seal including a confining means having an aperture therethrough and a shaft means extending through the aperture, a seal for said shaft means having hermetic connections with said shaft means and said confining means, said hermetic connections including an annular bellows and a set of relatively rotating annular sealing surfaces in contact with each other, one of which is connected to the bellows, a coil spring providing a resilient force for holding said sealing surfaces in contact with each other with a resilient force, and vibration dampening means extending between and contacting one of said means and said seal and an intermediate portion of said coil spring.

5. A shaft seal including a confining means having an aperture therethrough and a shaft means extending through the aperture, a seal for said shaft means having hermetic connections with said shaft means and said confining means, said hermetic connections including an annular bellows and a set of relatively rotating annular sealing surfaces in contact with each other, one of which is connected to the bellows, a coil spring providing a resilient force for holding said sealing surfaces in contact with each other with a resilient force, and a second coil spring threaded upon said first mentioned coil spring for preventing audible vibration of said seal, said second spring being in contact with one of said means.

6. A shaft seal including a confining means having an aperture therethrough and a shaft means extending through the aperture, a seal for said shaft means having hermetic connections with said shaft means and said confining means, said hermetic connections including an annular bellows and a set of relatively rotating annular sealing surfaces in contact with each other, one of which is connected to the bellows, a coil spring providing a resilient force for holding said sealing surfaces in contact with each other with a resilient force, and a second coil spring threaded upon said first mentioned coil spring for preventing audible vibration of said seal, said second spring being in contact with said seal.

7. A shaft seal including a confining means having an aperture therethrough and a shaft means extending through the aperture, a seal for said shaft means having hermetic connections with said shaft means and said confining means, said hermetic connections including an annular bellows and a set of relatively rotating annular sealing surfaces in contact with each other, one of which is connected to the bellows, a coil spring providing a resilient force for holding said sealing surfaces in contact with each other with a resilient force, and a second coil spring threaded upon said first mentioned coil spring for preventing audible vibration of said seal, said second spring being in contact with one of said means and said seal.

8. A shaft seal including a confining means having an aperture therethrough and a shaft means extending through the aperture, a seal for said shaft means having hermetic connections with said shaft means and said confining means, said hermetic connections including an annular bellows and a set of relatively rotating annular sealing surfaces in contact with each other, one of which is connected to the bellows, a coil spring providing a resilient force for holding said sealing surfaces in contact with each other with a resilient force, and a second coil spring threaded upon said first mentioned coil spring for preventing audible vibration of said seal, said second spring having a coil in contact with said seal and another coil in contact with one of said means.

OTTO M. SUMMERS.